(12) United States Patent
McGuffey et al.

(10) Patent No.: US 7,770,760 B2
(45) Date of Patent: Aug. 10, 2010

(54) MODULAR SYSTEM FOR THE DELIVERY OF HOT MELT ADHESIVE OR OTHER THERMOPLASTIC MATERIALS

(75) Inventors: Grant McGuffey, Springfield, TN (US); Daniel D. Bourget, Hendersonville, TN (US); Christof Schotten, Straelen (DE)

(73) Assignee: Illinois Tool Works Inc., Glenview, IL (US)

( * ) Notice: Subject to any disclaimer, the term of this patent is extended or adjusted under 35 U.S.C. 154(b) by 806 days.

(21) Appl. No.: 11/705,060

(22) Filed: Feb. 12, 2007

(65) Prior Publication Data

US 2008/0190959 A1  Aug. 14, 2008

(51) Int. Cl.
*B65D 88/54* (2006.01)
(52) U.S. Cl. .................. 222/333; 222/255; 137/884
(58) Field of Classification Search .............. 222/146.5, 222/255, 146.1, 318, 146.2, 504, 333; 137/884; 239/135
See application file for complete search history.

(56) References Cited

U.S. PATENT DOCUMENTS

| | | | |
|---|---|---|---|
| 4,408,562 A | 10/1983 | DeCamp et al. | |
| 4,988,015 A | 1/1991 | Price | |
| 5,407,101 A * | 4/1995 | Hubbard | 222/146.5 |
| 5,605,720 A | 2/1997 | Allen et al. | |
| 5,636,790 A * | 6/1997 | Brusko et al. | 239/124 |
| 5,893,490 A | 4/1999 | Gnyp | |
| 5,979,794 A | 11/1999 | DeFillipi et al. | |
| 6,089,413 A | 7/2000 | Riney et al. | |
| 6,171,089 B1 | 1/2001 | Oehman, Jr. | |
| 6,422,428 B1 | 7/2002 | Allen et al. | |
| 6,669,057 B2 * | 12/2003 | Saidman et al. | 222/146.5 |
| 6,688,498 B1 | 2/2004 | McGuffey | |
| 7,214,885 B2 * | 5/2007 | Byerly | 174/135 |
| 7,296,706 B2 * | 11/2007 | Raterman et al. | 222/1 |
| 2004/0099752 A1 | 5/2004 | Boger | |

FOREIGN PATENT DOCUMENTS

| | | |
|---|---|---|
| DE | 101 50 230 | 7/2002 |
| EP | 0 895 234 | 2/1999 |
| EP | 0 936 000 | 8/1999 |
| EP | 1 437 303 | 7/2004 |
| EP | 1 591 167 | 11/2005 |
| WO | WO 99/54055 | 10/1999 |
| WO | WO 02/43878 | 6/2002 |

* cited by examiner

*Primary Examiner*—Frederick C. Nicolas
(74) *Attorney, Agent, or Firm*—Law Offices of Steven W. Weinrieb

(57) ABSTRACT

A modular system, for delivering hot melt adhesive or other thermoplastic materials, comprises a modular metering assembly, having a plurality of metering stations disposed therein, which is able to be attachably and detachably mounted upon a modular tank or supply assembly. Alternatively, one or more of the plurality of metering stations may be disposed externally of the modular metering assembly, and alternatively still further, one or more additional modular metering assemblies may be attachably and detachably connected to the first modular metering assembly. In this manner, the entire modular system exhibits enhanced versatility and flexibility in order to effectively implement different material application procedures that may be required for different end-user customers.

24 Claims, 9 Drawing Sheets

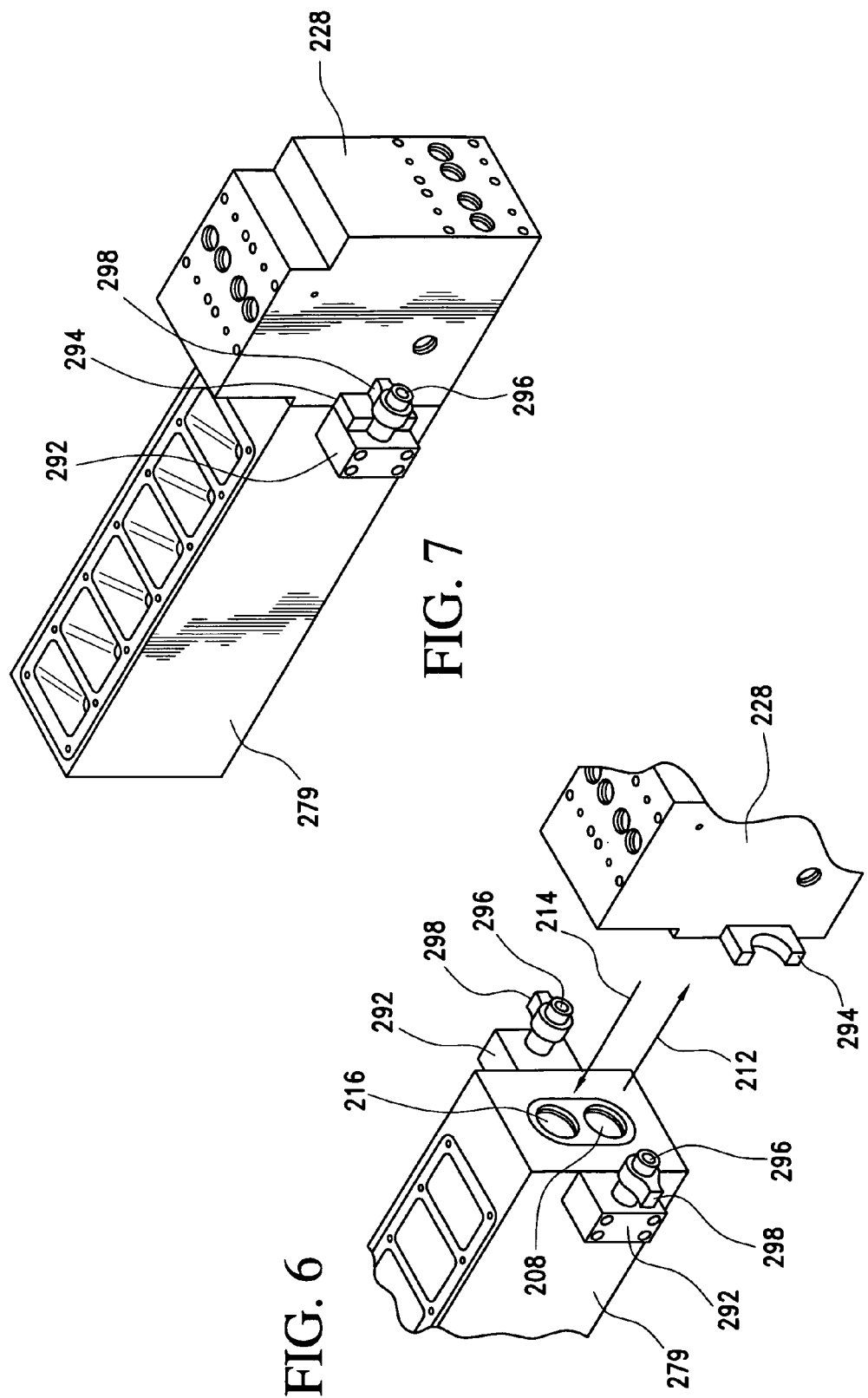

MODULAR SYSTEM FOR THE DELIVERY OF HOT MELT ADHESIVE OR OTHER THERMOPLASTIC MATERIALS

FIELD OF THE INVENTION

The present invention relates generally to hot melt adhesive or other thermoplastic material dispensing systems, and more particularly to a new and improved modular system for the delivery of hot melt adhesive or other thermoplastic materials wherein, for example, a modular metering assembly, having a plurality of hot melt adhesive or other thermoplastic material metering stations contained internally therewithin, is able to be attachably and detachably mounted upon, and operatively and fluidically connected to, a modular hot melt adhesive or other thermoplastic material tank or supply assembly. Alternatively, one or more of the plurality of hot melt adhesive or other thermoplastic material metering stations may be disposed externally of, and yet operatively and fluidically connected in an attachable and detachable manner, to and from the modular metering assembly, and alternatively still further, one or more additional modular metering assemblies may be operatively and fluidically connected, in an attachable and detachable manner, to and from the original modular metering assembly. In this manner, the entire modular system exhibits enhanced versatility and flexibility in order to effectively accommodate, or permit implementation of, various or different hot melt adhesive or other thermoplastic material deposition or application procedures that may be required by means of a particular end-user or customer.

BACKGROUND OF THE INVENTION

In connection with the delivery of hot melt adhesive or other thermoplastic materials for use in implementing various or different hot melt adhesive or other thermoplastic material deposition or application procedures, conventional practices have dictated that depending upon, or as a function of, particular predetermined application requirements or parameters, a particularly or specifically structured system be designed, manufactured, and installed. As can therefore be readily appreciated, when considered from a somewhat opposite or reverse point of view or perspective, and as is well known in the industry, different deposition or application procedures require different structural systems to be designed, manufactured, purchased, and installed. For example, different deposition or application procedures may require differently sized hot melt adhesive or other thermoplastic material supply units or tanks. Alternatively, different deposition or application procedures, comprising, for example, different output material volume parameters or requirements, may dictate or require the use or employment of different hot melt adhesive or other thermoplastic material metering pump assemblies. Alternatively, still further, different deposition or application procedures, comprising, for example, the minimalization of pressure losses, or the optimalization of pressure values, occurring within the various fluid flow lines or conduits comprising the entire hot melt adhesive or other thermoplastic delivery system, may dictate or require that the hot melt adhesive or other thermoplastic material metering pump assemblies and their applicators be disposed or located relatively close to the hot melt adhesive or other thermoplastic material supply units or tanks.

Still yet further, spatial or logistic parameters characteristic of a particular plant or manufacturing facility, that is, for example, the particular product manufacturing or production lines, may dictate or require that the hot melt adhesive or other thermoplastic material metering pump assemblies and their applicators be disposed or located remotely from the hot melt adhesive or other thermoplastic material supply units or tanks. Accordingly, it can be readily appreciated that if various hot melt adhesive or other thermoplastic material delivery systems are to be erected or installed within particular manufacturing facilities in connection with various production lines for implementing various or different hot melt adhesive or other thermoplastic material deposition or application procedures, it is prohibitively expensive to in fact incorporate such a variety of delivery systems within any one manufacturing plant or facility, or considered from an alternative point of view or perspective, different manufacturing plants or facilities would have to be erected in order to in fact accommodate such a variety of delivery systems. Alternatively, still further, while a particular delivery system could effectively be converted from one type of delivery system to another type of delivery system, again, the costs involved in connection with such conversion procedures would effectively prevent the same from being economically viable.

A need therefore exists in the art for a new and improved system for the delivery of hot melt adhesive or other thermoplastic materials, wherein the delivery system would be flexible and versatile as a result, for example, of the interchange or exchange of various components within the system, or as a result of the operative extension of the delivery system, whereby various different deposition or application procedures, having or characterized by means of various different operational parameters or requirements, can be readily achieved without the necessity of constructing or erecting a multitude of various different fixed or permanent delivery systems.

SUMMARY OF THE INVENTION

The foregoing and other objectives are achieved in accordance with the teachings and principles of the present invention through the provision of a new and improved modular system for the delivery of hot melt adhesive or other thermoplastic materials wherein, for example, a modular metering assembly, having a plurality of hot melt adhesive or other thermoplastic material metering stations contained internally therewithin, is able to be attachably and detachably mounted upon, and operatively and fluidically connected to, a modular hot melt adhesive or other thermoplastic material tank or supply assembly. Alternatively, one or more of the plurality of hot melt adhesive or other thermoplastic material metering stations may be disposed externally of, and yet operatively and fluidically connected in an attachable and detachable manner, to and from the modular metering assembly, and alternatively still further, one or more additional modular metering assemblies may be operatively and fluidically connected, in an attachable and detachable manner, to and from the first or original modular metering assembly. In this manner, the entire modular system exhibits enhanced versatility and flexibility in order to effectively accommodate, or permit implementation of, various or different hot melt adhesive or other thermoplastic material deposition or application procedures that may be required by means of a particular end-user or customer.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 4a is a cross-sectional view of the distribution manifold as illustrated within FIG. 4 and as taken along lines 4a-4a of FIG. 4;

FIG. 4b is a cross-sectional view of the distribution manifold as illustrated within FIG. 4a and as taken along lines 4b-4b of FIG. 4a;

FIG. 4c is a cross-sectional view of the distribution manifold as illustrated within FIG. 4a and as taken along lines 4c-4c of FIG. 4a;

FIG. 6 is a partial perspective view of the hot melt adhesive or other thermoplastic material collector housing, the distribution manifold, and a rotary clamping fastener assembly mounted upon the hot melt adhesive or other thermoplastic material collector and the distribution manifold for attachably and detachably mounting the distribution manifold upon the hot melt adhesive or other thermoplastic material collector housing, wherein the rotary clamping fastener assemblies are illustrated as being disposed at their unlocked positions such that distribution manifold can be detached from the hot melt adhesive or other thermoplastic material collector housing;

FIG. 7 is a partial perspective view, similar to that of FIG. 6, showing, however, one of the rotary clamping fastener assemblies disposed at its locked position such that the distribution manifold is able to be fixedly attached to the hot melt adhesive or other thermoplastic material collector housing;

DETAILED DESCRIPTION OF THE ILLUSTRATED EMBODIMENTS

Figure 1:
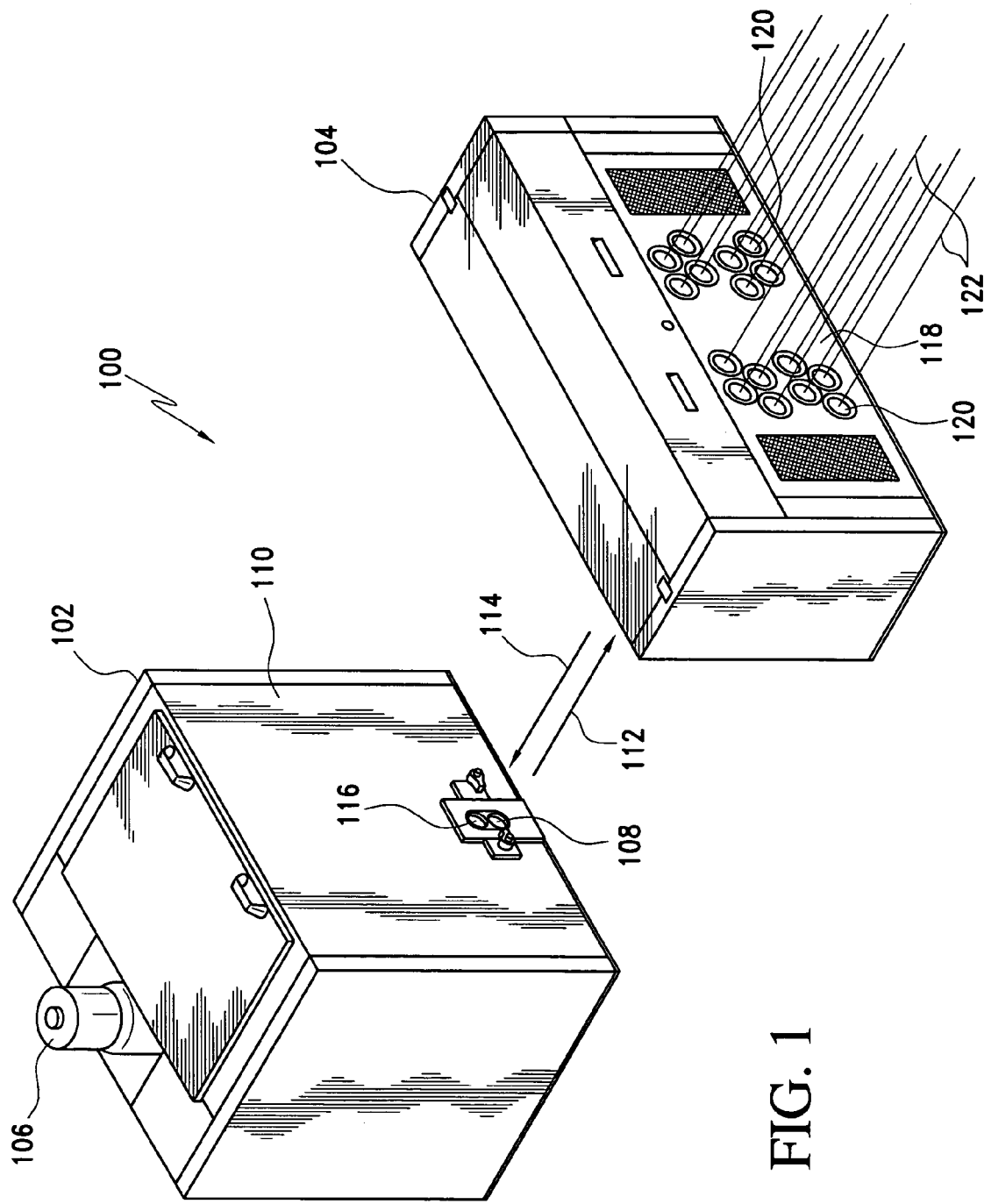
FIG. 1 is a perspective view of a first embodiment of a new and improved modular system, for the delivery of hot melt adhesive or other thermoplastic materials, as constructed in accordance with the principles and teachings of the present invention, and showing the cooperative parts thereof, wherein the modular metering assembly is independent of, and located remotely from, the modular tank assembly.

Referring now to the drawings, and more particularly to FIG. 1 thereof, a first embodiment of a new and improved modular system, for the delivery of hot melt adhesive or other thermoplastic materials, is disclosed and is generally indicated by the reference character 100. More particularly, it is seen that the new and improved modular delivery system 100 comprises a modular tank assembly 102 within which a supply of hot melt adhesive or other thermoplastic material is melted and stored, and a modular metering assembly 104 within which a plurality of metering stations, each comprising a plurality of metering gear pumps as will be disclosed more fully hereinafter, are disposed for outputting predetermined or precisely metered amounts of the hot melt adhesive or other thermoplastic materials. In accordance with additional structural features characteristic of the new and improved modular system 100 for delivering hot melt adhesive or other thermoplastic materials, it is further seen that the modular tank assembly 102 comprises a primary pump 106 which pressurizes the hot melt adhesive or other thermoplastic material, contained within the modular tank assembly 102, to a predetermined constant pressure value, and that the pressurized hot melt adhesive or other thermoplastic material is then supplied, at variable volume rates to the modular metering assembly 104 depending upon or as a function of the demand of the plurality of metering gear pumps disposed within the modular metering assembly 104, by means of a fluid supply outlet port 108, defined within a front wall member 110 of the modular tank assembly 102, and a fluid supply conduit 112 which may comprise a suitable heated hose. Unused hot melt adhesive or thermoplastic material is returned to the modular tank assembly 102, from the modular metering assembly 104, by means of a fluid return conduit 114 and a fluid return inlet port 116 also defined within the front wall member 110 of the modular tank assembly 102.

It can therefore be appreciated that, in accordance with the principles and teachings of this first embodiment of the present invention, the modular metering assembly 104 is independent of, and can be remotely located at various distances from, the modular tank assembly 102 as defined, for example, by means of various, predetermined length dimensions of the fluid supply and fluid return conduits 112,114. In addition, it is seen that the front wall member 118 of the modular metering assembly 104 is provided, for example, with sixteen fluid supply outlet ports 120, wherein the sixteen fluid supply outlet ports 120 are arranged in four sets or arrays, with each set or array of the fluid supply outlet ports 120 comprising four individual fluid supply outlet ports 120. As will become more apparent hereinafter, the outputs of the plurality of metering gear pumps, comprising the plurality of metering stations disposed within the modular metering assembly 104, are fluidically connected to the plurality of fluid supply outlet ports 120, and a plurality of applicator hoses, schematically shown at 122, may be respectively fluidically connected to the plurality of fluid supply outlet ports 120 so as to in fact supply the predetermined or precisely metered amounts of the hot melt adhesive or other thermoplastic materials to hot melt adhesive or thermoplastic material applicator heads.

Figure 2:
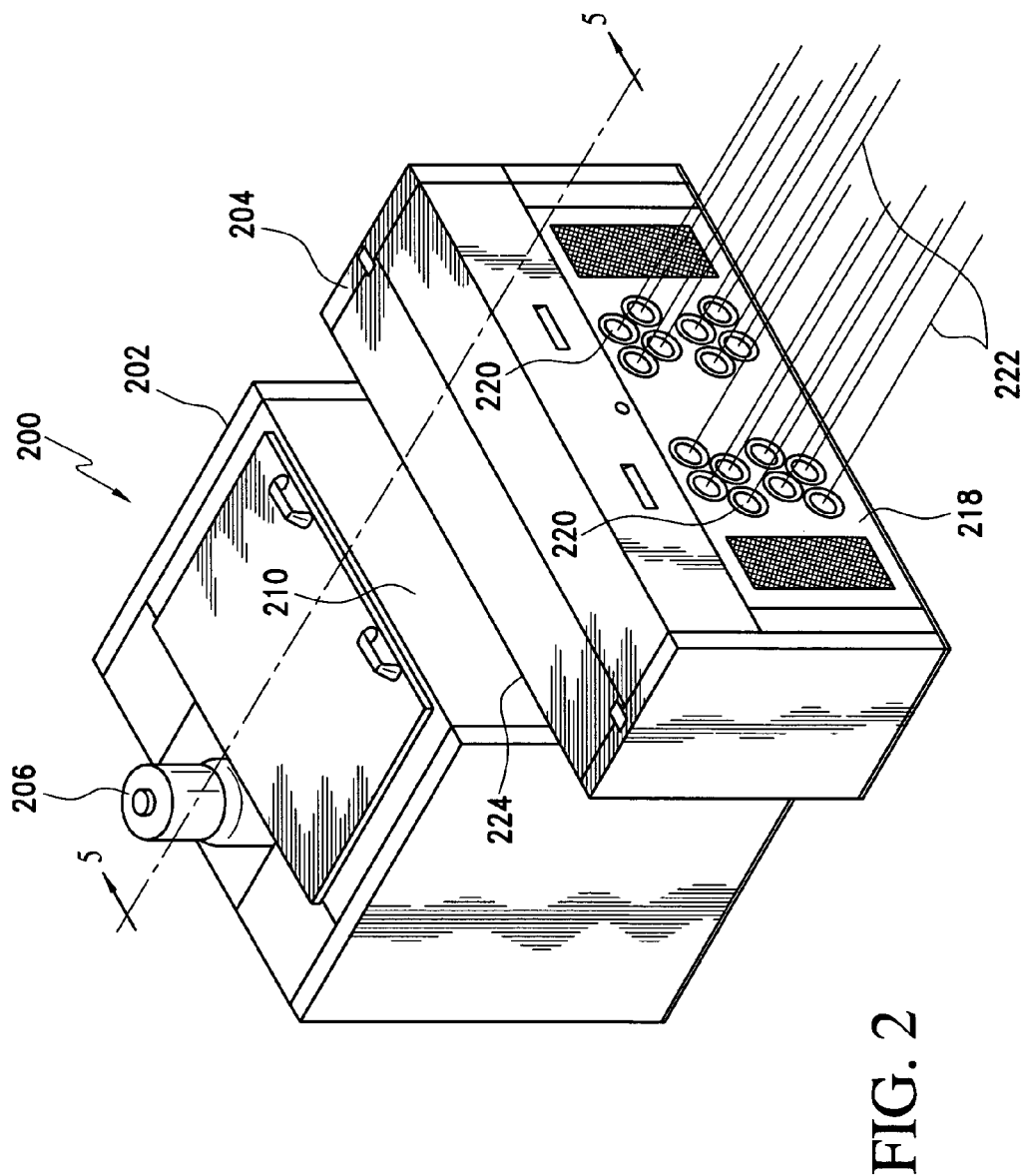
FIG. 2 is a perspective view, similar to that of FIG. 1, showing, however, a second embodiment of a new and improved modular system, for the delivery of hot melt adhesive or other thermoplastic materials, and also constructed in accordance with the principles and teachings of the present invention, wherein the modular metering assembly is fixedly attached to, and effectively forms an integral assembly with, the modular tank assembly.

With reference now being made to FIG. 2, a second embodiment of a new and improved modular system, for delivering hot melt adhesive or other thermoplastic materials, is disclosed and is generally indicated by the reference character 200. It is to be appreciated that this second embodiment modular system 200 is substantially similar to the first embodiment modular system 100 as disclosed within FIG. 1, except as will be discussed hereinafter, and therefore a detailed discussion of the second embodiment modular system 200 will be omitted for brevity purposes, the disclosure and description of the same being confined substantially to the differences between the first and second embodiment modular systems 100,200. In addition, it is also noted that in view of the similarity between the first and second embodiment modular systems 100,200, component parts of the second embodiment modular system 200 which correspond to component parts of the first embodiment modular system 100 will be designated by corresponding reference characters except for the fact that they will be within the 200 series. More particularly, one of the differences between the first and second embodiment modular systems 100,200 resides in the fact that, in accordance with the principles and teachings of the second embodiment modular system 200, the modular metering assembly 204 has been fixedly attached to the modular tank assembly 202 in order to effectively form a single integral unit. Cooperative fastener means, which will be disclosed hereinafter, are mounted upon the front wall member 210 of the modular tank assembly 202 and upon the rear wall member 224 of the modular metering assembly 204 so as to in fact attachably and detachably secure the modular metering assembly 204 to the modular tank assembly 202. In addition, as a result of such attachment of the modular metering assembly 204 to the modular tank assembly 202, and the formation of the aforenoted integral entity, the fluid supply and fluid return conduits 112,114, characteristic of the first embodiment modular system 100 and utilized to fluidically interconnect the modular tank assembly 102 to the modular metering assembly 104, are able to be eliminated.

Figure 3:
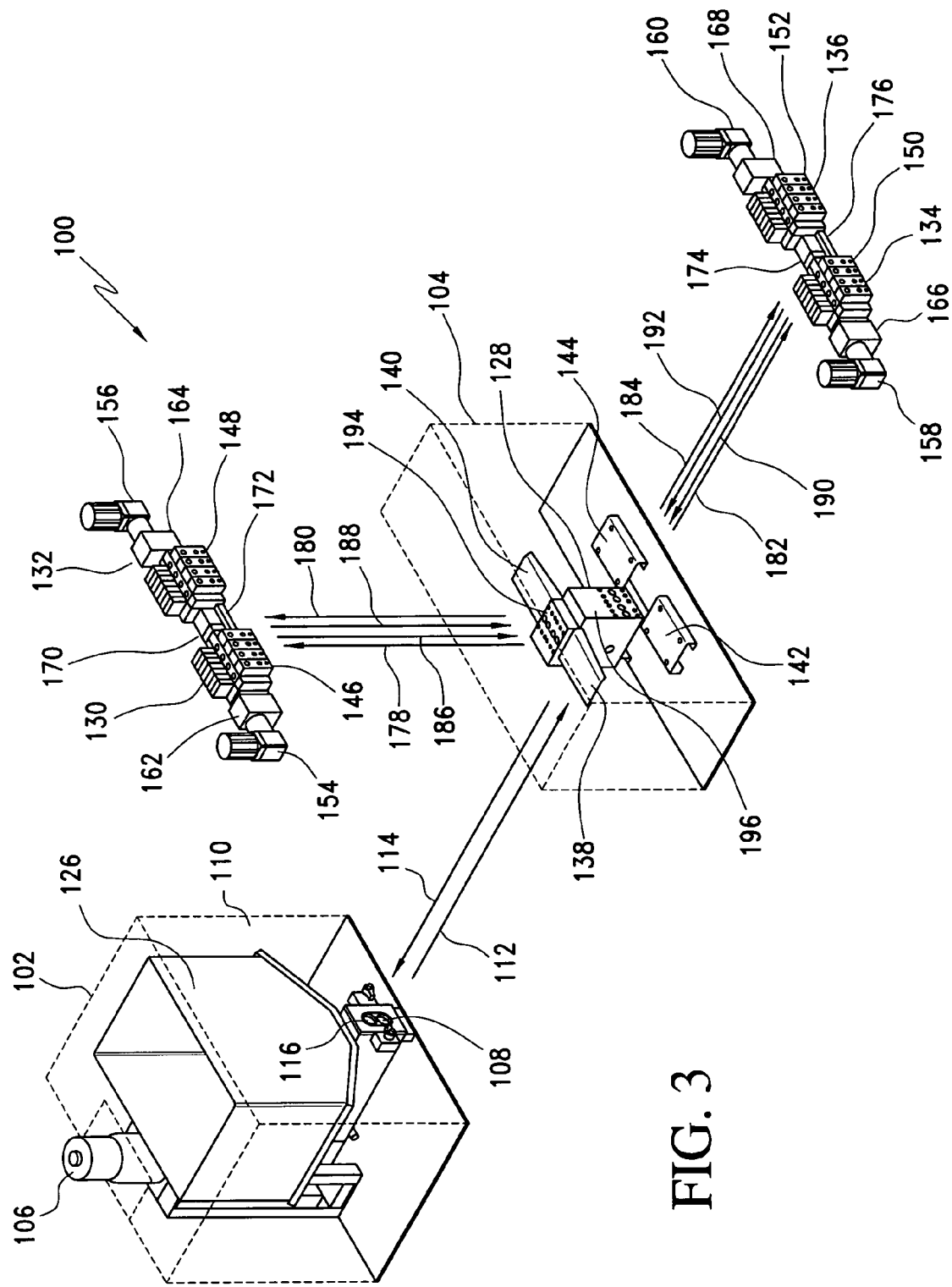
FIG. 3 is a perspective view, similar to, and corresponding to that of FIG. 1, showing, however, the internal components of the modular tank assembly and the internal components of the modular metering assembly with some of the internal components of the modular metering assembly illustrated in an exploded format for clarity purposes.

With reference now being made to FIG. 3, and effectively reverting back to, or considered in conjunction with, FIG. 1 disclosing the first embodiment modular system 100, the internal structural details of the modular tank assembly 102 and of the modular metering assembly 104 will now be discussed. More particularly, it is seen that the modular tank assembly 102 has disposed therein a hot melt adhesive or other thermoplastic material reservoir or hopper 126 within which a supply of the hot melt adhesive or other thermoplastic material is melted and maintained at a predeterminedly desired temperature level and viscosity. The primary pump 106 receives the hot melt adhesive or other thermoplastic material from the hot melt adhesive or other thermoplastic material reservoir or hopper 126, pressurizes the material to a predetermined pressure value, and conveys the same toward the modular metering assembly 104 through means of the fluid supply conduit 112. As can also be readily appreciated from FIG. 3, the modular metering assembly 104 has a distribution manifold 128 disposed internally thereof, and the distribution manifold 128 has a plurality of metering stations, such as, for example, four metering stations 130, 132,134, 136, fixedly mounted thereon and operatively or fluidically connected thereto. While the four metering stations 130,132, 134,136 are illustrated as being disposed externally of the modular metering assembly 104, it is to be understood and appreciated that the four metering stations 130,132,134, 136 are, in effect, being simply illustrated in an exploded format with respect to the modular metering assembly 104 for illustrative purposes only and that the four metering stations 130, 132,134,136, for delivering the hot melt adhesive or other thermoplastic materials to downstream applicator heads, are, in accordance with the principles and teachings of this first embodiment of the new and improved modular system, in fact adapted to be disposed internally within the modular metering assembly 104.

Accordingly, it is further seen that a plurality of mounting brackets 138,140,142,144 are fixedly secured internally within the modular metering assembly 104, and that the plurality of metering stations 130,132,134,136 are adapted to be respectfully mounted and fixedly secured thereon. Continuing still further, it is also seen that each one of the plurality of metering stations 130,132,134,136 is seen to respectively comprise a set of metering gear pumps 146,148,150, 152, a drive motor 154,156,158,160 for respectively rotatably driving each set of metering gear pumps 146,148,150,152 through means of a gearbox assembly 162,164,166,168, and a metering interface 170,172,174,176 for respectively providing a fluidic interface between the distribution manifold 128 and each set of metering gear pumps 146,148,150,152. In addition, it can also be appreciated that hot melt adhesive or other thermoplastic material fluid supply paths 178,180,182, 184, and hot melt adhesive or other thermoplastic material fluid return paths 186,188,190,192, are respectively defined between the distribution manifold 128 and each one of the metering interfaces 170,172,174,176 respectively associated with each set of metering gear pumps 146,148,150,152. Still yet further, it is seen that each one of the four sets of metering gear pumps 146,148,150,152 comprises, for example, four serially arranged metering gear pumps, and therefore, the total number of metering gear pumps operatively associated with and fluidically connected to the distribution manifold 128 disposed within the modular metering assembly 104 comprises sixteen metering gear pumps, the fluidic outputs of which are adapted to be fluidically connected to the fluid supply outlet ports 120 defined within the front wall member 118 of the modular metering assembly 104 as disclosed within FIG. 1.

It can therefore be appreciated that, in connection with the supply and return of the hot melt adhesive or other thermoplastic material, the hot melt adhesive or other thermoplastic material, disposed within the hot melt adhesive or other thermoplastic material reservoir or hopper 126, will be conveyed to the fluid supply outlet port 108, defined within the front wall member 110 of the modular tank assembly 102, by means of the primary pump 106, and the hot melt adhesive or other thermoplastic material will, in turn, be conveyed along the fluid supply conduit 112 to the distribution manifold 128 which, in turn, will convey the hot melt adhesive or other thermoplastic material to each set of metering gear pumps 146,148,150,152 by means of the hot melt adhesive or other thermoplastic material fluid supply paths 178,180,182, 184 and the metering interfaces 170,172,174,176. Conversely, hot melt adhesive or other thermoplastic material that is to be returned to the hot melt adhesive or other thermoplastic material reservoir or hopper 126 will be conveyed from each set of metering gear pumps 146,148,150,152 through means of its respective metering interface 170,172,174,176, the hot melt adhesive or other thermoplastic material fluid return paths 186,188,190,192, the distribution manifold 128, and the fluid return conduit 114.

Figure 4:
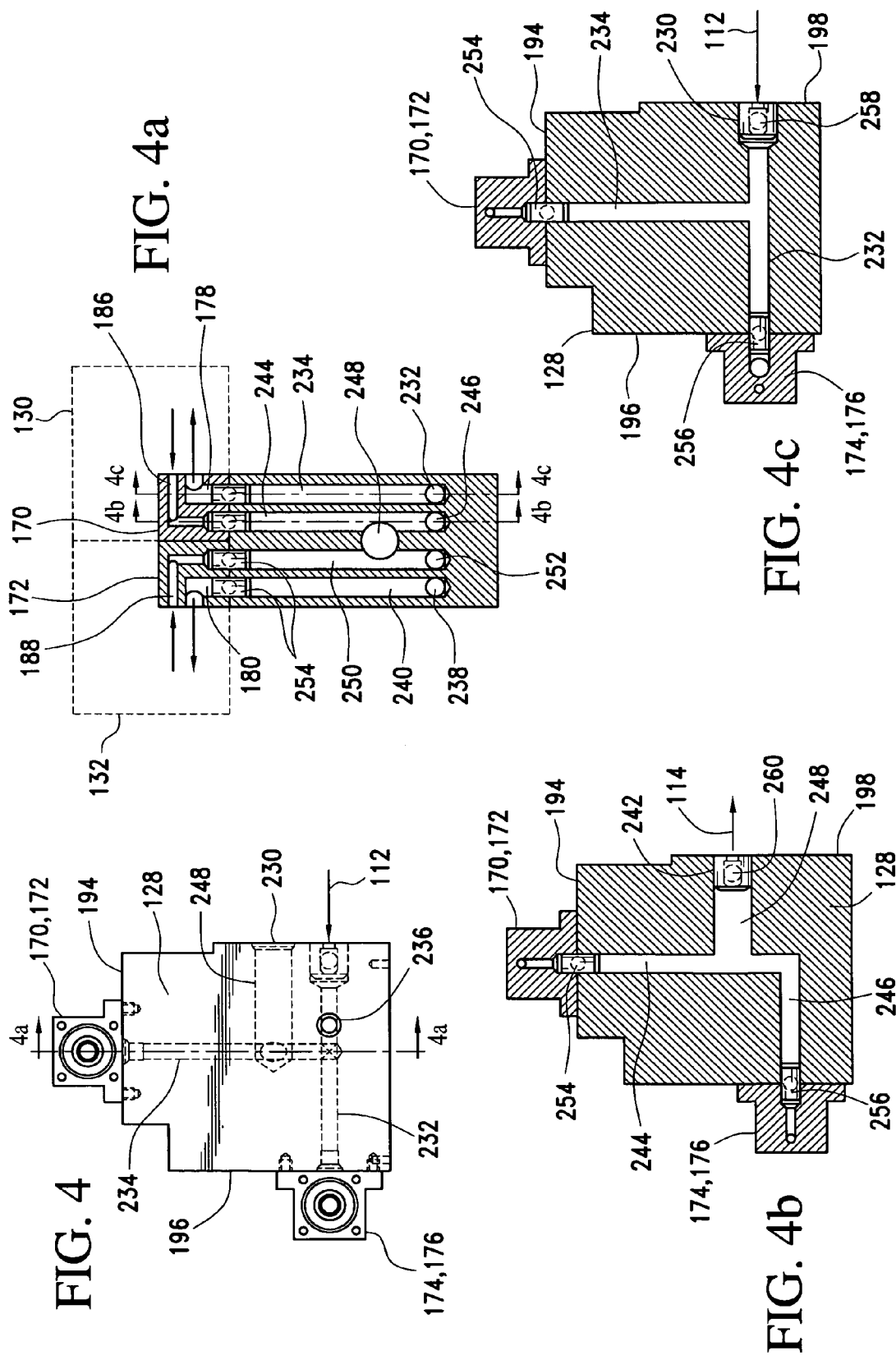
FIG. 4 is a side elevational view of the distribution manifold of the modular metering assembly, schematically showing the mounting of some of the metering station metering interfaces upon the upper and front wall members of the distribution manifold as well as some of the fluid conduits defined internally within the distribution manifold for supplying the hot melt adhesive or other thermoplastic material into and out from the distribution manifold.

With reference still being made to FIG. 3, and with additional reference being made to FIGS. 4-4c, it is seen that the metering interfaces 170,172, operatively and fluidically associated with the metering stations 130,132, are adapted to be mounted upon the upper or top wall member 194 of the distribution manifold 128, and that the metering interfaces 174,176, operatively and fluidically associated with the metering stations 134,136, are adapted to be mounted upon the front wall member 196 of the distribution manifold 128. In addition, as can best be appreciated and understood from FIGS. 4-4c, the different hot melt adhesive or other thermoplastic material fluid supply and fluid return passageways, defined internally within the distribution manifold 128 and leading toward and away from the metering interfaces 170, 172,174,176, and the sets of metering gear pumps 146,148, 150, 152 operatively and fluidically connected thereto, will now be disclosed and described. More particularly, as can be appreciated from FIGS. 4, 4a, and 4c, as well as FIG. 3, the fluid supply conduit 112 fluidically connected to, and extending outwardly from, the front wall member 110 of the modular tank assembly 102, is operatively and fluidically connected to a lower portion of the rear wall member 198 of the distribution manifold 128 by means of an inlet port 230. A first horizontal, longitudinally oriented fluid supply passageway 232 leads internally into the distribution manifold 128 from the inlet port 230, in the direction of the fluid supply conduit 112, so as to fluidically connect to a first one of the metering interfaces 174,176 disposed upon the front wall member 196 of the distribution manifold 128, while a first vertically oriented fluid supply passageway 234, fluidically connected to or intersecting the first horizontal fluid supply passageway 232, fluidically connects to a first one of the metering interfaces 170,172 disposed upon the upper or top wall member of the distribution manifold 128.

In addition, a second horizontal, transversely oriented fluid supply passageway 236, as seen in FIG. 4, fluidically interconnects the first horizontal fluid supply passageway 232 to a third horizontal fluid supply passageway 238, which extends substantially parallel to the first horizontal fluid supply passageway 232 and is seen in FIG. 4a, so as to provide hot melt adhesive or other thermoplastic material to a second one of the metering interfaces 174,176 disposed upon the front wall member 196 of the distribution manifold 128, while a second vertically oriented fluid supply passageway 240, disposed substantially parallel to the first vertically oriented fluid passageway 234, is fluidically connected to or intersects the third horizontal fluid supply passageway 238 so as to provide hot melt adhesive or other thermoplastic material to the second one of the metering interfaces 170,172 disposed upon the upper or top wall member 194 of the distribution manifold 128. After being conducted along the first and second vertically oriented fluid supply passageways 234,240, the hot melt adhesive or other thermoplastic material will effectively be conducted along the fluid supply paths 178,180, which are also schematically illustrated within FIG. 3, so as to respectively enter into the metering interfaces 170,172 from which the hot melt adhesive or other thermoplastic material will then be supplied to the metering gear pumps 146,148 of the metering stations 130,132. Similar fluid flow paths are of course provided in connection with the supply of the hot melt adhesive or other thermoplastic material to the metering interfaces 174,176 and the metering gear pumps 150,152 of the metering stations 134,136.

In connection with the return of the hot melt adhesive or other thermoplastic material from the metering stations 130, 132,134,136 back to the hot melt adhesive or other thermoplastic reservoir or storage tank 126 of the modular tank assembly 102, through means of the distribution manifold 128, reference to FIGS. 4, 4a, and 4b, as well as to FIG. 3, illustrates that, in a similar manner to the supply of the hot melt adhesive or other thermoplastic material to the distribution manifold 128, the distribution manifold 128 is provided with various internal fluid passageways so as to fluidically interconnect the metering interfaces 170,172,174,176 of the metering stations 130,132,134,136 to the fluid return conduit 114. More particularly, it is seen that the fluid return conduit 114 is fluidically connected to, and extends outwardly from, the rear wall member 198 of the distribution manifold 128, through means of a fluid outlet port 242, so as to fluidically mate with the fluid return inlet port 116 of the modular tank assembly 102. A first vertically oriented fluid return passageway 244 extends downwardly within the distribution manifold 128 from a first one of the metering interfaces 170,172 disposed upon the upper or top wall member 194 of the distribution manifold 128, and a first horizontal, longitudinally oriented fluid return passageway 246 extends inwardly within the distribution manifold 128 from a first one of the metering interfaces 174,176 disposed upon the front wall member 196 of the distribution manifold.

The first vertically oriented fluid return passageway 244 and the first horizontal, longitudinally oriented fluid return passageway 246 fluidically intersect or merge into a second horizontally oriented fluid return passageway 248 which is fluidically connected to the fluid outlet port 242, and as can best be seen from FIG. 4a, a second vertically oriented fluid return passageway 250, operatively and fluidically connected to a second one of the metering interfaces 170,172, is also provided internally within the distribution manifold 128 so as to extend substantially parallel to the first vertically oriented fluid return passageway 244 and to be fluidically connected to the second horizontally oriented fluid return passageway 248 leading to the fluid outlet port 242. In addition, a third horizontally oriented fluid return passageway 252 is provided for fluidically connecting the second one of the metering interfaces 174,176 to the second horizontally oriented fluid return passageway 248 and the fluid outlet port 242, and in this manner, return hot melt adhesive or other thermoplastic material is able to be returned to the hot melt adhesive or other thermoplastic material reservoir or hopper, from the metering stations 130,132, 134,136, along the fluid return paths 186, 188,190,192, the distribution manifold 128, and the fluid return conduit 114.

It is to be noted further that in connection with the plurality of supply and return fluidic interfaces defined, for example, between the plurality of metering interfaces 170,172,174,176 and the distribution manifold 128, as well as the fluidic interface defined, for example, between the fluid supply conduit 112 and the distribution manifold 128, and the fluidic interface defined, for example, between the fluid return conduit 114 and the distribution manifold 128, a pair of oppositely disposed check valves are respectively incorporated within the distribution manifold 128 and the plurality of metering interfaces 170,172,174,176, at the junctions of such components, as illustrated at 254,256 in FIG. 4b, and in a similar manner, a pair of oppositely disposed check valves are respectively incorporated within the distribution manifold 128 and the fluid supply and fluid return conduits 112, 114, at the junctions of such components, as illustrated at 258,260 in FIGS. 4c and 4b, although it is noted that only the check valves incorporated within the distribution manifold 128 are illustrated. As a result of the presence of such oppositely disposed check valves 254,256,258,260, the various structural components are able to be separated from each other without any inadvertent discharge or leakage of the hot melt adhesive or other thermoplastic material across the noted interfaces. It is also noted that in connection with, for example, the fluid supply and return conduits 112,114, such conduits 112,114 may be readily and easily attachably and detachably connected to the distribution manifold 128 and the modular tank assembly 102 by means of suitable threaded fittings or the like.

Figure 5:
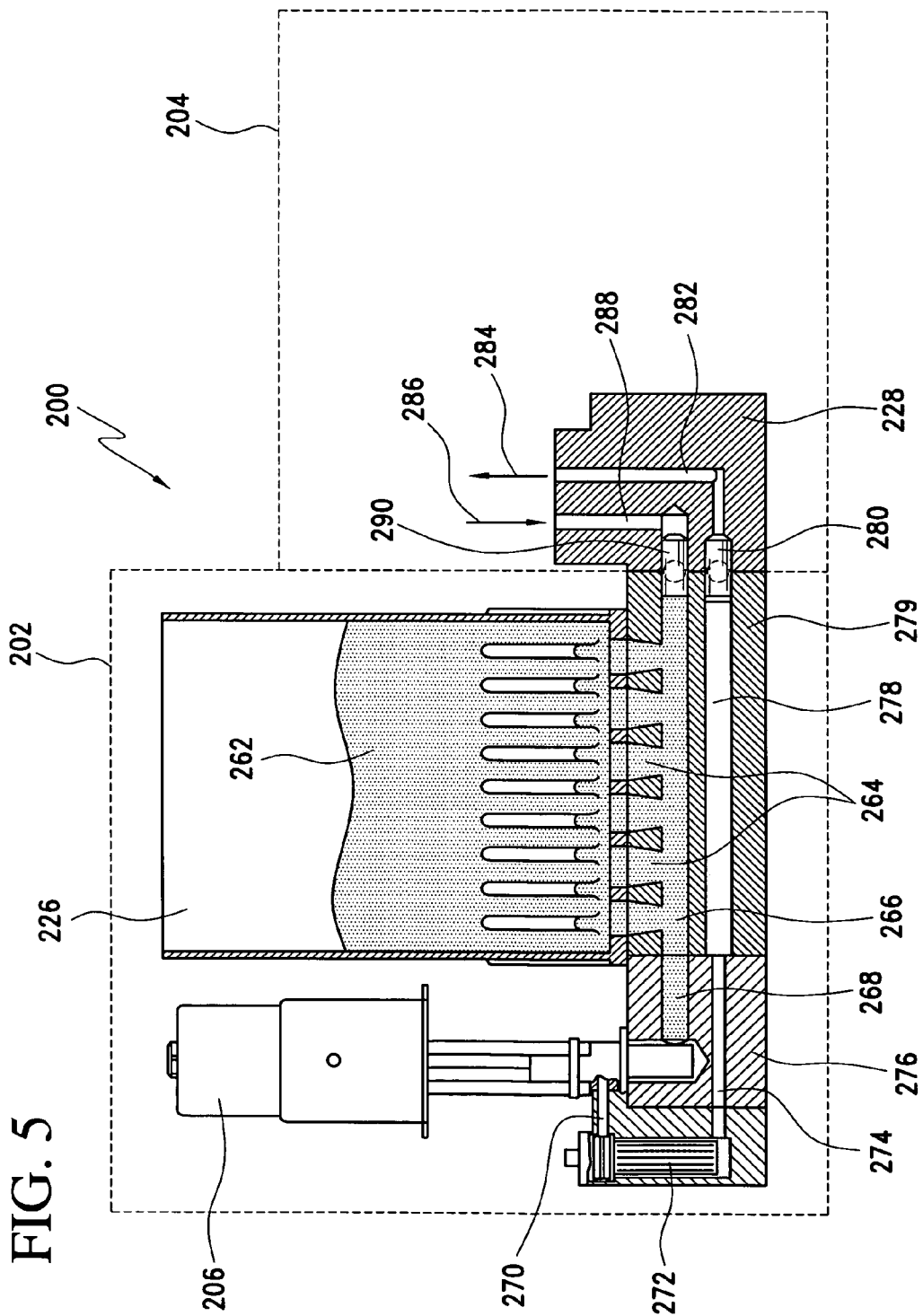
FIG. 5 is a cross-sectional view of the integral modular tank assembly-modular metering assembly entity as illustrated within FIG. 2 and as taken along the lines 5-5 of FIG. 2.

With reference now being made to FIG. 5, and effectively reverting back to, or considered in conjunction with, FIG. 2 disclosing the second embodiment modular system 200, additional internal structural details of the modular tank assembly 202, and its operative and fluidic connection to the modular metering assembly 204, will now be discussed. More particularly, it is seen that the modular tank assembly 202 has the primary pump 206 and a hot melt adhesive or other thermoplastic material reservoir or hopper 226, similar to the hot melt adhesive or other thermoplastic material reservoir or hopper 126, disposed therein, and that the modular metering assembly 204 has a distribution manifold 228, similar to the distribution manifold 128, disposed therein. The hot melt adhesive or other thermoplastic material reservoir or hopper 226 contains a supply of hot melt adhesive or other thermoplastic material 262 therewithin, and the lower end or bottom portion of the hot melt adhesive or other thermoplastic material reservoir or hopper 226 is effectively apertured, as at 264, so as to permit the melted hot melt adhesive or other thermoplastic material 262 to discharge into a horizontally oriented collection passageway 266 which is fluidically connected to a pump supply passageway 268 which leads to the inlet end of the primary pump 206. The primary pump 206 then outputs the hot melt adhesive or other thermoplastic material 262 to its pump outlet passageway 270 whereby the hot melt adhesive or other thermoplastic material 262 then passes through a strainer-filter member 272 so as to remove unwanted or undesirable particles or impurities therefrom.

After passing through the strainer-filter member 272, the hot melt adhesive or other thermoplastic material 262 then enters a first horizontally oriented output passageway 274, which is formed within the lower region of the primary pump housing 276, and a second horizontally oriented output passageway 278 which is formed within the base region or lower collector housing portion 279 of the reservoir or hopper 226 and which is fluidically connected to the distribution manifold 228 through means of a pair of oppositely disposed check valves 280 which may be similar to the aforenoted check valves 258. The hot melt adhesive or other thermoplastic material 262 is then conducted through a vertically oriented supply passageway 282, which may be similar to either one of the vertically oriented supply passageways 234, 240, so as to be conducted along a fluid supply path 284, which may be similar to either one of the fluid supply paths 178,180, leading to metering interfaces similar to the metering interfaces 170, 172. In a similar manner, hot melt adhesive or other thermoplastic material 262 can be returned, from the metering interfaces, to the collection passageway 226 along a fluid return path 286, which may be similar to either one of the fluid return paths 186,188, a vertically oriented return passageway 288 which may be similar to either one of the vertically oriented passageways 244,250, and a pair of oppositely disposed check valves 290 which may be similar to the aforenoted check valves 260.

Continuing further, in order to fixedly secure together the distribution manifold 228 and the lower collector housing portion 279 of the reservoir or hopper 226, in an attachable and detachable manner, suitable fastener assemblies, such as, for example, a pair of rotary clamping fastener assemblies may be utilized. More particularly, as can best be seen in FIG. 6, each one of the pair of rotary clamping fastener assemblies comprises a pair of mounting blocks 292, 292, which are fixedly mounted upon opposite sides of the lower collector housing portion 279 of the reservoir or hopper 226, and a pair of clamping brackets, only one of which is visible as at 294, mounted upon opposite sides of the distribution manifold 228. Each one of the clamping brackets 294 has a substantially C-shaped cross-sectional configuration, and each one of the mounting blocks 292,292 is internally threaded so as to respectively receive an externally threaded adjustment or tightening screw 296,296.

A rotary or pivotal clamping member 298 is freely rotatably mounted upon each one of the adjustment or tightening screws 296, and accordingly, when the distribution manifold 228 is to be fixedly mounted upon and connected to the lower collector housing portion 279 of the reservoir or hopper 226, the clamping members 298,298 are initially disposed at their unlocked position as illustrated within FIG. 6. The lower collector housing portion 279 of the reservoir or hopper 226, with the mounting blocks 292,292 and the clamping members 298,298 mounted thereon, is then, in effect, moved in a direction parallel to the longitudinal axes of the adjustment or tightening screws 296,296 such that the enlarged portions of the clamping members 298,298 pass through the C-shaped clamping brackets 294. After effectively clearing the C-shaped clamping brackets 294, the clamping members 298, 298 are then rotated or pivoted around the adjustment or tightening screws 296,296 through means of an angular extent of 180°, and subsequently, the adjustment or tightening screws 296,296 are tightened so as to cause the projecting lug portions of the clamping members 298,298 to respectively tightly engage the clamping brackets 294 thereby causing the lower collector housing portion 279 of the reservoir or hopper 226 and the distribution manifold 228 to be tightly engaged with each other.

Figure 8:
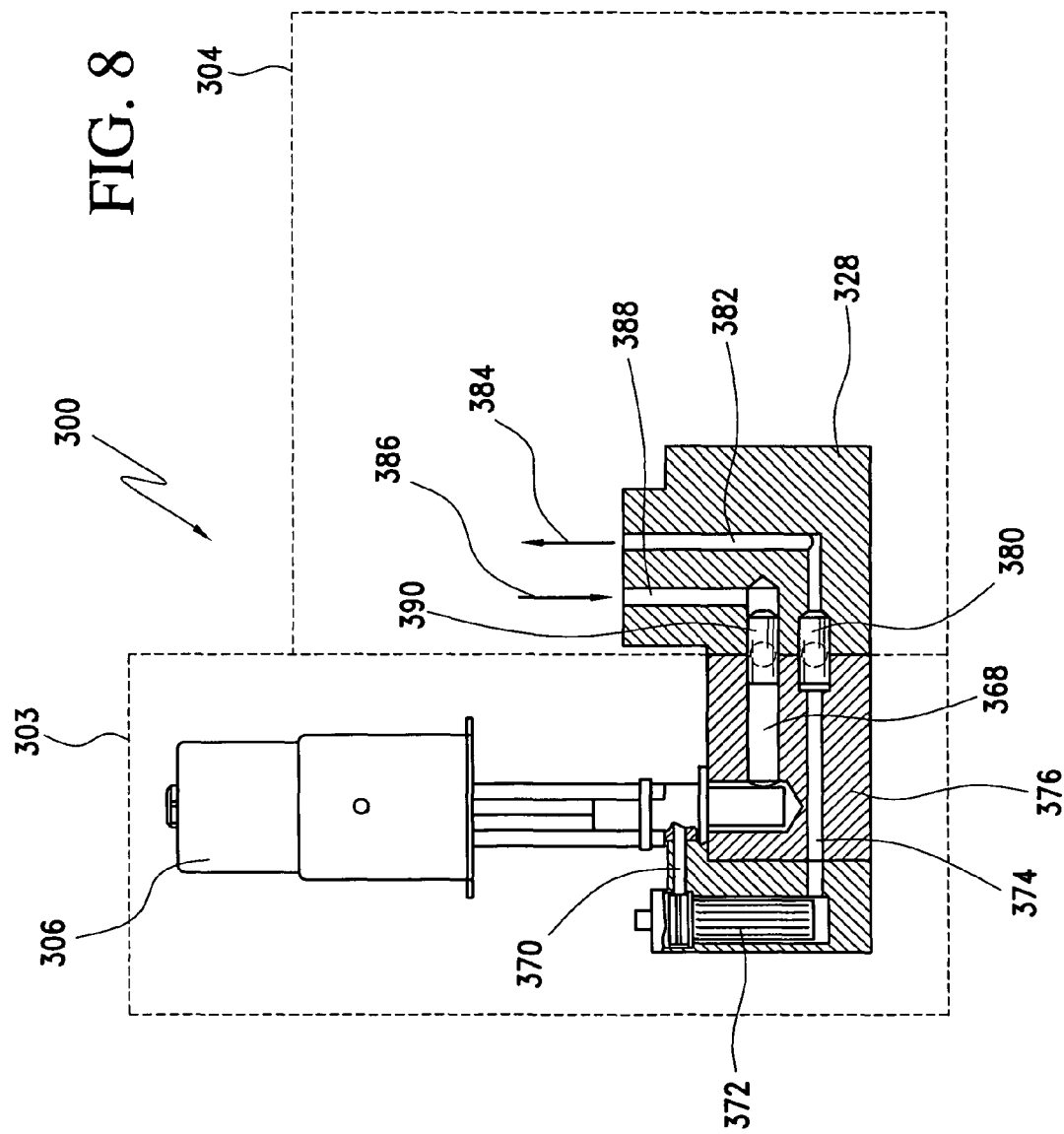
FIG. 8 is a cross-sectional view, similar to that of FIG. 5, showing, however, a third embodiment of a new and improved modular system, for the delivery of hot melt adhesive or other thermoplastic materials, and also constructed in accordance with the principles and teachings of the present invention, wherein the modular metering assembly is fixedly attached to, and effectively forms an integral assembly with a modular pump assembly, the modular tank assembly being separate, and located at a remote location, from the modular pump assembly.

With reference now being made to FIG. 8, a third embodiment of a new and improved modular system for the delivery of hot melt adhesive or other thermoplastic materials, constructed in accordance with the principles and teachings of the present invention, and similar to the second embodiment modular system 200 as disclosed within FIGS. 2 and 5, except as will be noted hereinafter, is disclosed and is generally indicated by the reference character 300. It is to be appreciated that in view of the fact that this third embodiment modular system 300 is similar to the second embodiment modular system 200 as disclosed within FIGS. 2 and 5, a detailed discussion of the third embodiment modular system 300 will be omitted for brevity purposes, the disclosure and description of the same being confined substantially to the differences between the second and third embodiment modular systems 200,300. In addition, it is also noted that in view of the similarity between the second and third embodiment modular systems 200,300, component parts of the third embodiment modular system 300 which correspond to component parts of the second embodiment modular system 200 will be designated by corresponding reference characters except that they will be within the 300 series. More particularly, one of the differences between the second and third embodiment modular systems 200,300 resides in the fact that, in accordance with the principles and teachings of the third embodiment modular system 300, the hot melt adhesive or other thermoplastic reservoir tank or hopper, and its operatively associated collector housing portion, as respectively disclosed at 226 and 279 within FIG. 5, have effectively been eliminated, and therefore, in lieu of the modular tank assembly 202, characteristic of the second embodiment modular system 200, the third embodiment modular system 300 comprises a modular pump or supply assembly 303 within which the primary pump 306, and its strainer-filter member 372, are located. Still further, it is also to be appreciated that in accordance with the principles and teachings of the third embodiment modular system 300, the modular metering assembly 304 is fixedly attached directly to, and effectively forms an integral assembly with the modular pump assembly 303, and that the modular tank assembly, not shown, now comprises a separate modular entity which may be located at a location remote from the modular pump assembly. Accordingly, the modularity concepts, interchangeability of component parts depending upon, or as a function of, the various needs or requirements of the end-user or customer, are therefore enhanced still further.

Figure 9:
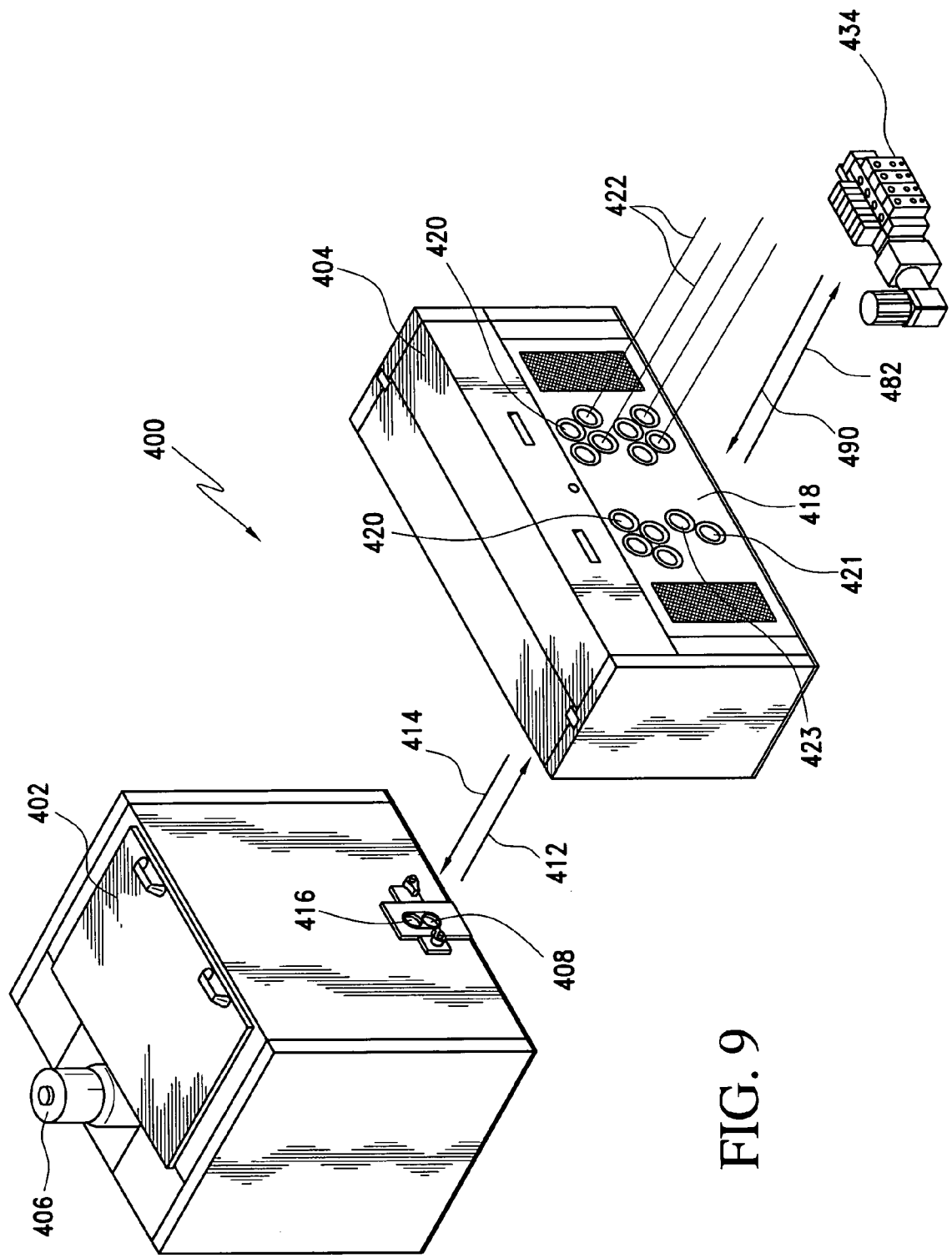
FIG. 9 is a perspective view, similar to that of FIG. 3, showing, however, a fourth embodiment of a new and improved modular system, for the delivery of hot melt adhesive or other thermoplastic materials, and also constructed in accordance with the principles and teachings of the present invention, wherein one, or more, or all of the plurality, of metering stations is or are in fact located externally of, and remote from, the modular metering assembly and the distribution manifold disposed therein.

With reference now being made to FIG. 9, a fourth embodiment of a new and improved modular system for the delivery of hot melt adhesive or other thermoplastic materials, constructed in accordance with the principles and teachings of the present invention, and similar to the first embodiment modular system 100 as disclosed within FIGS. 1 and 3, except as will be noted hereinafter, is disclosed and is generally indicated by the reference character 400. It is to be appreciated that in view of the fact that this fourth embodiment modular system 400 is similar to the first embodiment modular system 100 as disclosed within FIGS. 1 and 3, a detailed discussion of the fourth embodiment modular system 400 will be omitted for brevity purposes, the disclosure and description of the same being confined substantially to the differences between the fourth and first embodiment modular systems 400,100. In addition, it is also noted that in view of the similarity between the fourth and first embodiment modular systems 400,100, component parts of the fourth embodiment modular system 400 which correspond to component parts of the first embodiment modular system 100 will be designated by corresponding reference characters except that they will be within the 400 series.

More particularly, one of the differences between the fourth and first embodiment modular systems 400,100 resides in the fact that, in accordance with the principles and teachings of the fourth embodiment modular system 400, one or more, or all, of the plurality of metering stations, such as, for example, the metering station 434, which may be similar to the metering station 134 of the first embodiment modular system 100 as disclosed within FIG. 3, can in fact be located externally of, and remote from, the modular metering assembly 404. In connection with the external disposition of the metering station 434 with respect to the modular metering assembly 404, and the distribution manifold disposed internally thereof but not illustrated within FIG. 9, the plurality of metering gear pumps of the other metering stations, disposed internally within the modular metering assembly 404 but also not illustrated within FIG. 9, will function in a manner similar to the metering stations 130,132,136 of the modular metering assembly 104 as illustrated within FIG. 3 wherein such internally disposed metering stations of the modular metering assembly 404 will have their fluid outputs respectively fluidically conducted to the fluid supply outlet ports 420 defined within the front wall member 418 of the modular metering assembly 404. In this manner, a plurality of applicator hoses 422 can be respectively fluidically connected to the plurality of fluid supply outlet ports 420 for conducting the hot melt adhesive or other thermoplastic material to applicator heads or the like.

However, since, for example, the metering station 434 is disposed externally of, and remote from, the modular metering assembly 404, the fluid supply outlet ports, which would normally be defined within the front wall member 418 of the modular metering assembly 404 as a result of being respectfully fluidically connected to and associated with the metering gear pump outputs of the metering station 434, are not in fact defined or provided within the front wall member 418 of the modular metering assembly 404, but, to the contrary, the hot melt adhesive or other thermoplastic material will be routed internally within the distribution manifold disposed within the modular metering assembly 404 and outputted to the externally and remotely located metering station 434 from an outlet supply port 421 defined within the front wall member 418 of the modular metering assembly 404 and conducted along a hot melt adhesive or other thermoplastic material fluid supply path 482 which is similar to the hot melt adhesive or other thermoplastic material fluid supply path 182 as disclosed within FIG. 3 and which also may be similar in structure to the fluid supply conduit 412. In a similar manner, hot melt adhesive or other thermoplastic material, being conducted from the external, remote metering station 434 back to the modular metering assembly 404 and the distribution manifold disposed therewithin, will be conducted along a hot melt adhesive or other thermoplastic material fluid return path 490 which is similar to the hot melt adhesive or other thermoplastic material fluid return path 190 as disclosed within FIG. 3, for entry into an inlet return port 423 defined within the front wall member 418 of the modular metering assembly 404 so as to be conducted back to the distribution manifold disposed within the modular metering assembly 404, and which may be similar in structure to the fluid return conduit 414.

Figure 10:
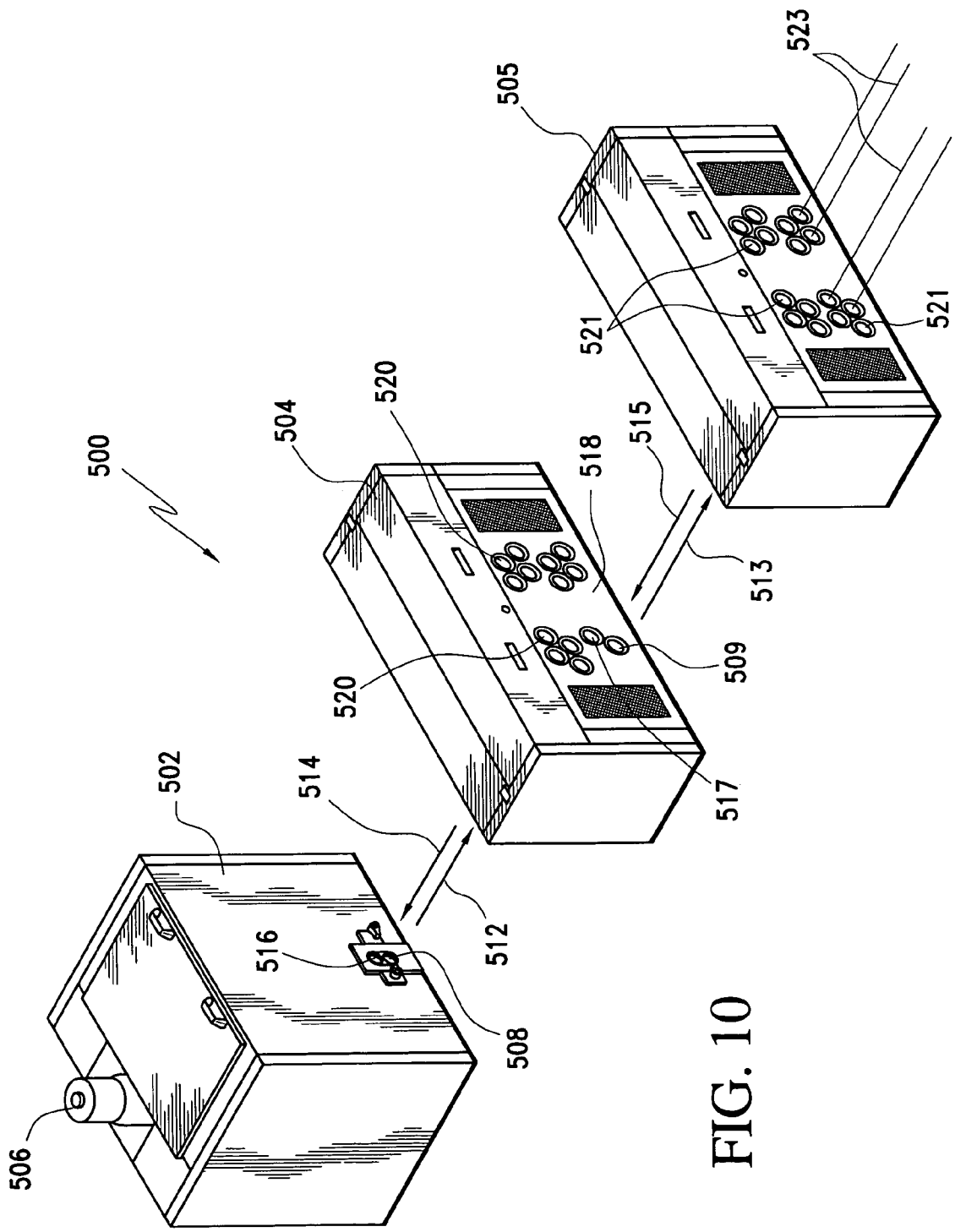
FIG. 10 is a perspective view, similar to those of FIGS. 1 and 9, showing, however, a fifth embodiment of a new and improved modular system, for the delivery of hot melt adhesive or other thermoplastic material, and also constructed in accordance with the principles and teachings of the present invention, wherein one or more additional modular metering assemblies can be located remote from and serially connected to the original or first modular metering assembly and the distribution manifold disposed therein.

With reference lastly being made to FIG. 10, a fifth embodiment of a new and improved modular system for the delivery of hot melt adhesive or other thermoplastic materials, constructed in accordance with the principles and teachings of the present invention, and similar to the first and fourth embodiment modular systems 100,400 as disclosed within FIGS. 1 and 3, and 9, except as will be noted hereinafter, is disclosed and is generally indicated by the reference character 500. It is to be appreciated that in view of the fact that this fifth embodiment modular system 500 is similar to the first and fourth embodiment modular systems 100,400 as disclosed within FIGS. 1 and 3, and 9, a detailed discussion of the fifth embodiment modular system 500 will be omitted for brevity purposes, the disclosure and description of the same being confined substantially to the differences between the fifth and first or fourth embodiment modular systems 500, 100,400. In addition, it is also noted that in view of the similarity between the fifth and first or fourth embodiment modular systems 500,100,400, component parts of the fifth embodiment modular system 500 which correspond to component parts of the first or fourth embodiment modular system 100,400 will be designated by corresponding reference characters except that they will be within the 500 series.

More particularly, one of the differences between the fifth and first or fourth embodiment modular systems 500, 100,400 resides in the fact that, in lieu of all of the metering stations 130,132,134, 136 being located internally within the modular metering assembly 104 as disclosed within the first embodiment modular system 100 as disclosed within FIGS. 1 and 3, and in lieu of one or more of the metering stations being located externally of the modular metering assembly 404 as has been disclosed within the fourth embodiment modular system 400 as illustrated at 434 in FIG. 9, in accordance with the principles and teachings of the fifth embodiment modular system 500, one or more, but not all, of the metering stations, similar to the metering stations 130,132, 136 located internally within the modular metering assembly 104 of the first embodiment modular system 100 as disclosed within FIGS. 1 and 3, may, for example, be similarly located internally within the modular metering assembly 504, while concomitantly, for example, one or more of the metering stations, similar to the metering station 434 operatively and fluidically connected to the modular metering assembly 404 of the fourth embodiment modular system 400 as disclosed within FIG. 9, may effectively be removed from the modular metering assembly 504 and replaced by, for example, a second modular metering assembly 505, which internally houses a second set or array of metering stations, not shown but similar to the first set or array of metering stations 130,132,134,136 disposed internally within the first modular metering assembly 504, such that the first and second modular metering assemblies 504,505 are fluidically connected together in a serial manner.

More specifically, in view of the fact that, for example, the metering station, normally disposed internally within the modular metering assembly 504 and similar to, for example, the metering station 134 or 434, has effectively been replaced by means of the second modular metering assembly 505 which is located externally of, and remote from, the first modular metering assembly 504, the fluid supply outlet ports, which would normally be defined within the front wall member 518 of the first modular metering assembly 504 as a result of being respectfully fluidically connected to and associated with the metering gear pump outputs of the metering station 134 or 434, are not in fact defined or provided within the front wall member 518 of the first modular metering assembly 504, but, to the contrary, the hot melt adhesive or other thermoplastic material will be routed internally within the distribution manifold disposed within the first modular metering assembly 504 and outputted to the externally and remotely located second modular metering assembly 505 from a fluid supply outlet port 509, similar to fluid supply outlet port 508, defined within the front wall member 518 of the first modular metering assembly 504 and conducted along a fluid supply conduit 513 similar to the fluid supply conduit 512. In a similar manner, hot melt adhesive or other thermo-plastic material, being conducted from the second modular metering assembly 505 back to the first modular metering assembly 504 and the distribution manifold disposed therewithin, will be conducted along a fluid return conduit 515, similar to the fluid return conduit 514, for entry into a fluid return inlet port 517, similar to fluid return inlet port 516, also defined within the front wall member 518 of the first modular metering assembly 504 so as to be conducted back to the distribution manifold disposed within the first modular metering assembly 504. Still yet further, it is also to be appreciated that a plurality of fluid supply outlet ports 521, similar to the fluid supply outlet ports 120,420, are defined within the front wall member 519 of the second modular metering assembly 505, and that a plurality of applicator hoses 523, similar to the applicator hoses 122,422, are adapted to be respectively fluidically connected to the plurality of fluid supply outlet ports 521. In this manner, in accordance with the principles and teachings of the fifth embodiment modular system 500 of the present invention, it can be appreciated that a plurality of modular metering assemblies can be serially connected together, disposed at different, remote locations with respect to each other, and in turn, also permit different sets or arrays of metering stations, and their operatively associated applicators or the like, to likewise be located at different, remote locations.

Thus, it may be seen that in accordance with the principles and teachings of the present invention, a new and improved modular system for the delivery of hot melt adhesive or other thermoplastic materials has been disclosed wherein, for example, a modular metering assembly, having a plurality of hot melt adhesive or other thermoplastic material metering stations contained internally therewithin, is able to be attachably and detachably mounted upon, and operatively and fluidically connected to, a modular hot melt adhesive or other thermoplastic material tank or supply assembly. Alternatively, one or more of the plurality of hot melt adhesive or other thermoplastic material metering stations may be disposed externally of, and yet operatively and fluidically connected in an attachable and detachable manner, to and from the modular metering assembly, and alternatively still further, one or more additional modular metering assemblies may be operatively and fluidically connected, in an attachable and detachable manner, to and from the first or original modular metering assembly. In this manner, the entire modular system exhibits enhanced versatility and flexibility in order to effectively accommodate, or permit implementation of, various or different hot melt adhesive or other thermoplastic material deposition or application procedures that may be required by means of a particular end-user or customer.

Obviously, many variations and modifications of the present invention are possible in light of the above teachings. More particularly, various structural permutations and combinations of the various system components, as have been disclosed and illustrated within the aforenoted drawing figures, are also possible. For example, while all of the metering stations 130,132,134,136 of the modular metering assembly 104 have been disclosed as being located internally within its modular metering assembly 104 in accordance with the principles and teachings of the first embodiment modular system 100 as illustrated within FIGS. 1 and 3, while one or more of the metering stations, such as, for example, the metering station 434 of the modular metering assembly 404, have been disclosed as being located externally of its modular metering assembly 404 in accordance with the principles and teachings of the fourth embodiment modular system 400 as illustrated within FIG. 9, and while one or more of the metering stations located internally within the modular metering assembly 504 have, in effect, been removed from the modular metering assembly 504 and have, in effect, been replaced by means of the second modular metering assembly 505, it can be further appreciated or envisioned that one or more of the metering stations of a particular modular metering assembly can be located externally of such particular modular metering assembly while in addition, one or more of the other metering stations of such particular modular metering assembly can be removed from the particular modular metering assembly and be replaced by means of another serially connected modular metering assembly. It is therefore to be understood that within the scope of the appended claims, the present invention may be practiced otherwise than as specifically described herein.

What is claimed as new and desired to be protected by letters patent of the United States of America, is:

1. A modular system for delivering a fluid material, comprising:

a modular supply assembly for supplying a fluid material;

a modular metering assembly comprising a plurality of separate metering stations wherein each one of said plurality of separate metering stations comprises a set of metering pumps comprising a plurality of metering pumps for outputting predetermined amounts of said fluid material toward a plurality of applicators, and a plurality of motors for respectively driving each one of said sets of metering pumps comprising each one of said separate metering stations; and connector structure for connecting said modular supply assembly, for supplying said fluid material, to said modular metering assembly, comprising said plurality of separate metering stations, in an attachable and detachable manner such that not only can said fluid material be supplied from said modular supply assembly to said plurality of metering pumps comprising said plurality of separate metering stations, but in addition, said modular supply assembly and said modular metering assembly can be readily attached and detached from each other whereby different modular assemblies and different modular metering assemblies may be readily interchangeably connected to each other in a modular manner.

2. The modular delivery system as set forth in claim 1, wherein:
said connector structure, for connecting said modular supply assembly to said modular metering assembly, comprises first and second fasteners respectively mounted upon wall members of said modular supply assembly and said modular metering assembly whereby said modular supply assembly and said modular metering assembly are connected together as an integral unit.

3. The modular delivery system as set forth in claim 2, wherein:
said first fastener comprises a clamping bracket fixedly mounted upon a first one of said wall members of said modular supply assembly and said modular metering assembly; and
said second fastener comprises a rotary clamping member rotatably mounted upon a second one of said wall members of said modular supply assembly and said modular metering assembly so as to be movable between a first position at which said rotary clamping member is disengaged from said clamping bracket fixedly mounted upon said first one of said wall members of said modular supply assembly and said modular metering assembly, and a second position at which said rotary clamping member is engaged with said clamping bracket fixedly mounted upon said first one of said wall members of said modular supply assembly and said modular metering assembly.

4. The modular delivery system as set forth in claim 1, further comprising:
a distribution manifold disposed within said modular metering assembly for distributing said fluid to said plurality of separate metering stations disposed within said modular metering assembly.

5. The modular delivery system as set forth in claim 4, wherein:
said connector structure, for connecting said modular supply assembly to said modular metering assembly, comprises first and second fasteners respectively mounted upon wall members of said modular supply assembly and said distribution manifold of said modular metering assembly whereby said modular supply assembly and said modular metering assembly are connected together as an integral unit.

6. The modular delivery system as set forth in claim 5, wherein:
said first fastener comprises a clamping bracket fixedly mounted upon a first one of said wall members of said modular supply assembly and said distribution manifold of said modular metering assembly; and
said second fastener comprises a rotary clamping member rotatably mounted upon a second one of said wall members of said modular supply assembly and said distribution manifold of said modular metering assembly so as to be movable between a first position at which said rotary clamping member is disengaged from said clamping bracket fixedly mounted upon said first one of said wall members of said modular supply assembly and said distribution manifold of said modular metering assembly, and a second position at which said rotary clamping member is engaged with said clamping bracket fixedly mounted upon said first one of said wall members of said modular supply assembly and said distribution manifold of said modular metering assembly.

7. The modular delivery system as set forth in claim 1, wherein:
said connector structure, for connecting said modular supply assembly in an attachable and detachable manner with respect to said modular metering assembly, comprises at least one fluid-conducting hose member interconnecting said modular supply assembly to said modular metering assembly.

8. The modular delivery system as set forth in claim 7, further comprising:
oppositely disposed check valves, disposed within opposite end portions of said at least one fluid-conducting hose member, and within port locations respectively provided within said modular supply and said modular metering assemblies, such that when either one of said opposite end portions of said at least one fluid-conducting hose member is disconnected from one of said modular supply and modular metering assemblies in order to implement the detachment of said modular supply and modular metering assemblies from each other, inadvertent leakage of said fluid material, from either one of said modular supply and modular metering assemblies, is prevented.

9. The modular delivery system as set forth in claim 4, wherein:
said connector structure, for fluidically connecting said modular supply assembly to said modular metering assembly in an attachable and detachable manner with respect to said modular metering assembly, comprises at least one fluid-conducting hose member interconnecting said modular supply assembly to said distribution manifold of said modular metering assembly.

10. The modular delivery system as set forth in claim 9, further comprising:
oppositely disposed check valves, disposed within opposite end portions of said at least one fluid-conducting hose member, and within port locations respectively provided within said modular supply assembly and said distribution manifold of said modular metering assembly, such that when either one of said opposite end portions of said at least one fluid-conducting hose member is disconnected from one of said port locations respectively provided within said modular supply assembly and said distribution manifold of said modular metering assembly in order to implement the detachment of said modular supply and modular metering assemblies from each other, inadvertent leakage of said fluid material, from either one of said modular supply and modular metering assemblies, is prevented.

11. The modular delivery system as set forth in claim 4, further comprising:
oppositely disposed check valves, disposed within port locations respectively provided within said distribution manifold of said modular metering assembly and within said plurality of separate metering stations, such that when any one of said plurality of separate metering stations is disconnected from said distribution manifold, inadvertent leakage of said fluid material, from either one of said distribution manifold and said any one of said plurality of separate metering stations, is prevented.

12. The modular delivery system as set forth in claim 4, further comprising:
oppositely disposed check valves, disposed within port locations respectively provided within said distribution manifold of said modular metering assembly and within said modular supply assembly, such that when said distribution manifold of said modular metering assembly and said modular supply assembly are disconnected from each other, inadvertent leakage of said fluid material, from either one of said distribution manifold and said modular supply assembly, is prevented.

13. The modular delivery system as set forth in claim 1, wherein:
at least one of said plurality of separate metering stations, comprising said modular metering assembly, is disposed internally within said modular metering assembly.

14. The modular delivery system as set forth in claim 1, wherein:
at least one of said plurality of separate metering stations, comprising said modular metering assembly, is disposed externally of said modular metering assembly.

15. The modular delivery system as set forth in claim 14, further comprising:
said connector structure for fluidically connecting said at least one of said plurality of separate metering stations, disposed externally of said modular metering assembly, to said modular metering assembly, in an attachable and detachable manner with respect to said modular metering assembly.

16. The modular delivery system as set forth in claim 15, wherein:
said connector structure, for fluidically connecting said at least one of said plurality of separate metering stations to said modular metering assembly, comprises at least one fluid-conducting hose member.

17. The modular delivery system as set forth in claim 16, further comprising:
oppositely disposed check valves, disposed within opposite end portions of said at least one fluid-conducting hose member, and within port locations respectively provided within said at least one of said plurality of separate metering stations and said modular metering assembly, such that when either one of said opposite end portions of said at least one fluid-conducting hose member is disconnected from one of said at least one of said plurality of separate metering stations and said modular metering assembly, inadvertent leakage of said fluid material, from either one of said at least one of said plurality of separate metering stations and said modular metering assembly, is prevented.

18. The modular delivery system as set forth in claim 1, wherein:
said modular supply assembly comprises a modular tank assembly which has a fluid reservoir incorporated therein and a supply pump for supplying said fluid from said fluid reservoir to said modular metering assembly.

19. The modular delivery system as set forth in claim 1, wherein:
said modular supply assembly comprises a modular pump assembly, adapted to be connected to a remotely located fluid reservoir, for supplying said fluid from said fluid reservoir to said modular metering assembly.

20. The modular delivery system as set forth in claim 1, further comprising:
at least one additional modular metering assembly fluidically connected to said modular metering assembly and also comprising a plurality of separate metering stations wherein each one of said plurality of separate metering stations, comprising said at least one additional modular metering assembly, comprises a set of metering pumps comprising a plurality of metering pumps for outputting predetermined amounts of said fluid material toward a plurality of applicators, and a plurality of motors for respectively driving each one of said sets of metering pumps comprising each one of said separate metering stations.

21. The modular delivery system as set forth in claim 20, further comprising:
said connector structure for fluidically connecting said at least one additional modular metering assembly to said modular metering assembly.

22. The modular delivery system as set forth in claim 21, wherein:
said connector structure, for fluidically connecting said at least one additional modular metering assembly to said modular metering assembly, comprises at least one fluid-conducting hose member.

23. The modular delivery system as set forth in claim 22, further comprising:
oppositely disposed check valves, disposed within opposite end portions of said at least one fluid-conducting hose member, and within port locations respectively provided within said at least one additional modular metering assembly and said modular metering assembly, such that when either one of said opposite end portions of said at least one fluid-conducting hose member is disconnected from one of said at least one additional modular metering assembly and said modular metering assembly, inadvertent leakage of said fluid material, from either one of said at least one additional modular metering assembly and said modular metering assembly, is prevented.

24. The modular delivery system as set forth in claim 1, wherein:
said modular system for delivering said fluid material comprises a modular system for delivering hot melt adhesive material.

\* \* \* \* \*